US 7,761,659 B2

(12) United States Patent
Lubbers et al.

(10) Patent No.: US 7,761,659 B2
(45) Date of Patent: Jul. 20, 2010

(54) WAVE FLUSHING OF CACHED WRITEBACK DATA TO A STORAGE ARRAY

(75) Inventors: Clark E. Lubbers, Colorado Springs, CO (US); Michael D. Walker, Colorado Springs, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 108 days.

(21) Appl. No.: 11/479,107

(22) Filed: Jun. 30, 2006

(65) Prior Publication Data
US 2008/0005464 A1  Jan. 3, 2008

(51) Int. Cl.
G06F 12/00  (2006.01)
(52) U.S. Cl. ...................................... 711/113
(58) Field of Classification Search ........................ None
See application file for complete search history.

(56) References Cited

U.S. PATENT DOCUMENTS

| | | | |
|---|---|---|---|
| 5,257,352 A | 10/1993 | Yamamoto et al. | |
| 5,644,786 A * | 7/1997 | Gallagher et al. | 710/30 |
| 5,694,581 A * | 12/1997 | Cheng | 710/7 |
| 5,829,018 A | 10/1998 | Moertl et al. | |
| 5,875,455 A | 2/1999 | Ito | |
| 6,189,080 B1 | 2/2001 | Ofer | |
| 6,567,888 B2 | 5/2003 | Kedem | |
| 6,629,211 B2 | 9/2003 | McKnight et al. | |
| 6,671,766 B1 | 12/2003 | Vandenbergh et al. | |
| 6,738,865 B1 | 5/2004 | Burton et al. | |
| 6,789,163 B2 * | 9/2004 | Fox et al. | 711/112 |
| 6,868,439 B2 | 3/2005 | Basu et al. | |
| 6,928,518 B2 * | 8/2005 | Talagala | 711/135 |
| 6,978,325 B2 | 12/2005 | Gibble et al. | |
| 7,028,297 B2 | 4/2006 | Horn et al. | |
| 7,237,062 B2 | 6/2007 | Lubbers et al. | |
| 2002/0078303 A1 | 6/2002 | Rozario et al. | |
| 2002/0095546 A1 * | 7/2002 | Dimitri et al. | 711/112 |
| 2004/0024971 A1 | 2/2004 | Bogin et al. | |
| 2004/0205297 A1 | 10/2004 | Bearden | |
| 2005/0223156 A1 | 10/2005 | Lubbers et al. | |
| 2007/0300035 A1 * | 12/2007 | Brewer et al. | 711/170 |
| 2008/0307160 A1 * | 12/2008 | Humlicek | 711/113 |

* cited by examiner

Primary Examiner—Tuan V Thai
Assistant Examiner—Duc T Doan
(74) Attorney, Agent, or Firm—Fellers, Snider, et al.

(57) ABSTRACT

Method and apparatus for wave flushing cached writeback data to a storage array. A cache manager operates to initiate a wave flushing operation whereby sets of writeback data in a cache memory are sequentially written to each of a plurality of logical groups radially concentric with respect to the storage medium. During the wave flushing operation, a write transducer is radially advanced across the medium in a single radial direction across boundaries between immediately adjacent groups. The write operations thus form a traveling wave across the medium, analogous to a wave in a sports stadium formed by spectators standing up and sitting down in turn. Each logical group preferably corresponds to a selected transducer seek range, such as an associated RAID stripe. Seeks are preferably bi-directional within each group, and uni-directional between adjacent groups. A dwell time (service time interval) for each group can be constant, or adaptively adjusted.

22 Claims, 6 Drawing Sheets

WAVE FLUSHING OF CACHED WRITEBACK DATA TO A STORAGE ARRAY

FIELD OF THE INVENTION

The claimed invention relates generally to the field of data storage systems and more particularly, but not by way of limitation, to a method and apparatus for wave flushing cached writeback data to a storage array.

BACKGROUND

Storage devices are used to access data in a fast and efficient manner. Some types of storage devices use rotatable storage media, along with one or more data transducers that write data to and subsequently read data from tracks defined on the media surfaces.

Multi-device arrays (MDAs) can employ multiple storage devices to form a consolidated memory space. One commonly employed format for an MDA utilizes a RAID (redundant array of independent discs) configuration, wherein input data are stored across multiple storage devices in the array. Depending on the RAID level, various techniques including mirroring, striping and parity code generation can be employed to enhance the integrity of the stored data.

With continued demands for ever increased levels of storage capacity and performance, there remains an ongoing need for improvements in the manner in which storage devices in such arrays are operationally managed. It is to these and other improvements that preferred embodiments of the present invention are generally directed.

SUMMARY OF THE INVENTION

Preferred embodiments of the present invention are generally directed to an apparatus and method for wave flushing cached writeback data to a storage array.

In accordance with preferred embodiments, a cache manager operates to initiate a wave flushing operation whereby sets of writeback data in a cache memory are sequentially written to each of a plurality of logical groups radially concentric with respect to the storage medium. During the wave flushing operation, a write transducer is radially advanced across the medium in a single radial direction across boundaries between immediately adjacent groups.

The write operations thus form a traveling wave across the medium, analogous to a wave in a sports stadium formed by spectators in each section standing up and sitting down in turn.

Each logical group preferably corresponds to a selected transducer seek range, such as an associated RAID stripe. Seeks are preferably bi-directional within each group, and uni-directional between groups. A dwell time (service time interval) for each group can be constant, or adaptively adjusted in relation to the operational load.

The wave flushing operation can be implemented on an on-going basis, such as in a write dominated environment in which a substantially higher number of write requests are issued in comparison to the number of read requests.

The wave flushing operation can further be implemented to flush all pending writeback data to the storage array such as in response to a power loss condition. In this way, required battery backup time capacity of an uninterruptible power supply (UPS) module can be substantially reduced.

These and various other features and advantages which characterize the claimed invention will become apparent upon reading the following detailed description and upon reviewing the associated drawings.

DETAILED DESCRIPTION

Figure 1:
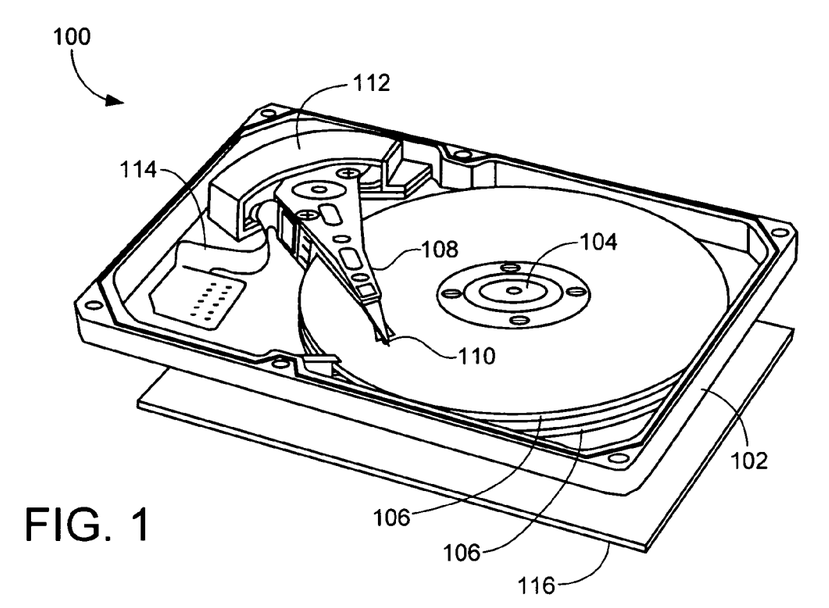
FIG. 1 generally illustrates a storage device constructed and operated in accordance with preferred embodiments of the present invention.

FIG. 1 shows an exemplary storage device 100 configured to store and retrieve user data. The device 100 is preferably characterized as a hard disc drive, although other device configurations can be readily employed as desired.

A base deck 102 mates with a top cover (not shown) to form an enclosed housing. A spindle motor 104 is mounted within the housing to controllably rotate media 106, preferably characterized as magnetic recording discs.

A controllably moveable actuator 108 moves an array of read/write transducers 110 adjacent tracks defined on the media surfaces through application of current to a voice coil motor (VCM) 112. A flex circuit assembly 114 provides electrical communication paths between the actuator 108 and device control electronics on an externally mounted printed circuit board (PCB) 116.

Figure 2:
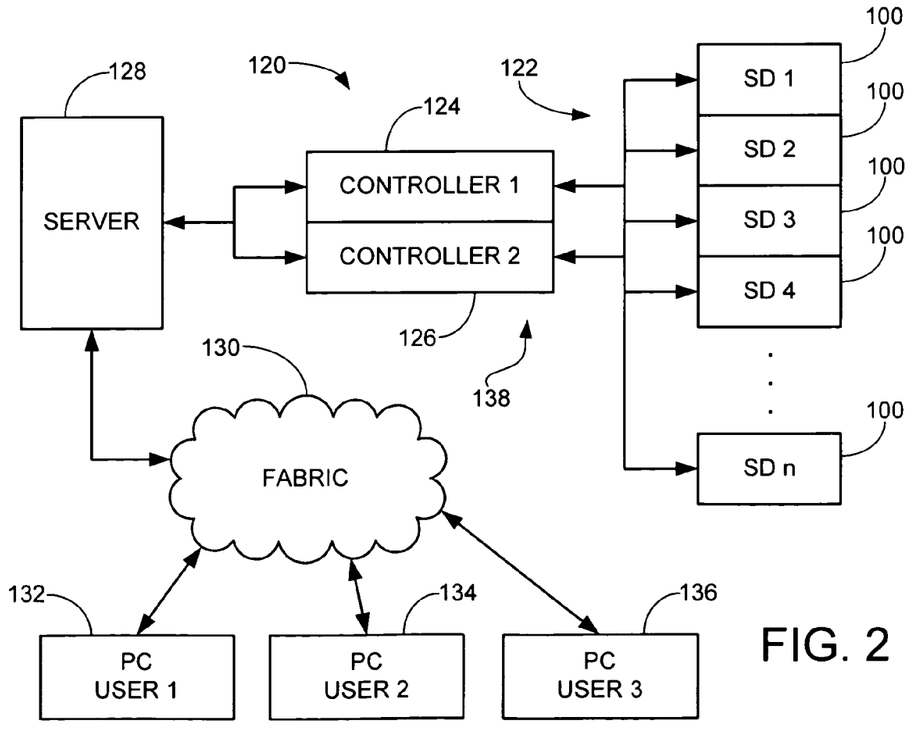
FIG. 2 is a functional block diagram of a network system which utilizes a number of storage devices such as illustrated in FIG. 1.

FIG. 2 generally illustrates an exemplary network system 120 that advantageously incorporates a number n of the storage devices (SD) 100 to form a consolidated storage array 122. Redundant controllers 124, 126 preferably operate to transfer data between the storage array 122 and a server 128. The server 128 in turn is connected to a fabric 130, such as a local area network (LAN), the Internet, etc.

Remote users respectively access the fabric 130 via personal computers (PCs) 132, 134, 136. In this way, a selected user can access the storage space 122 to write or retrieve data as desired.

The devices 100 and the controllers 124, 126 are preferably incorporated into a multi-device array (MDA) 138. The MDA 138 preferably uses one or more selected RAID (redundant array of independent discs) configurations to store data across the devices 100. Although only one MDA and three remote users are illustrated in FIG. 2, it will be appreciated that this is merely for purposes of illustration and is not limiting; as desired, the network system 120 can utilize any number and types of MDAs, servers, client and host devices, fabric configurations and protocols, etc.

Figure 3:
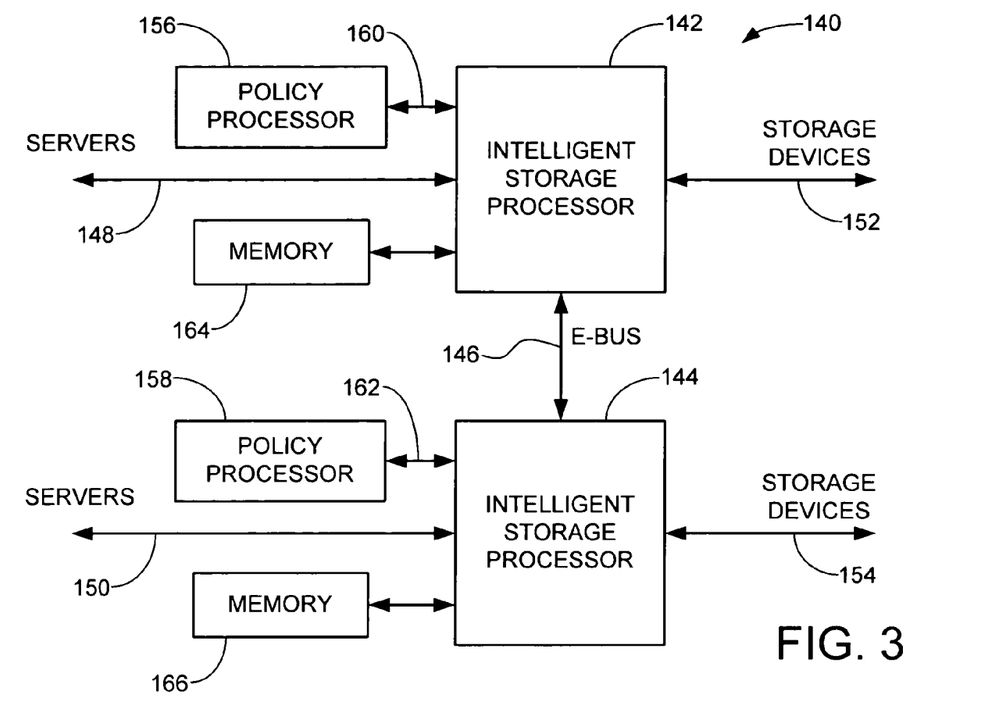
FIG. 3 provides a general representation of a preferred architecture of the controllers of FIG. 2.

FIG. 3 shows an array controller configuration 140 such as useful in the network of FIG. 2. Two intelligent storage processors (ISPs) 142, 144 are coupled by an intermediate bus 146 (referred to as an "E BUS"). Each of the ISPs 142, 144 is preferably disposed in a separate integrated circuit package on a common controller board. Preferably, the ISPs 142, 144 each respectively communicate with upstream application servers via fibre channel server links 148, 150, and with the storage devices 100 via fibre channel storage links 152, 154.

Policy processors 156, 158 execute a real-time operating system (ROTS) for the controller 140 and communicate with the respective ISPs 142, 144 via PCI busses 160, 162. The policy processors 156, 158 can further execute customized logic to perform sophisticated processing tasks in conjunction with the ISPs 142, 144 for a given storage application. The ISPs 142, 144 and the policy processors 156, 158 access memory modules 164, 166 as required during operation.

Figure 4:
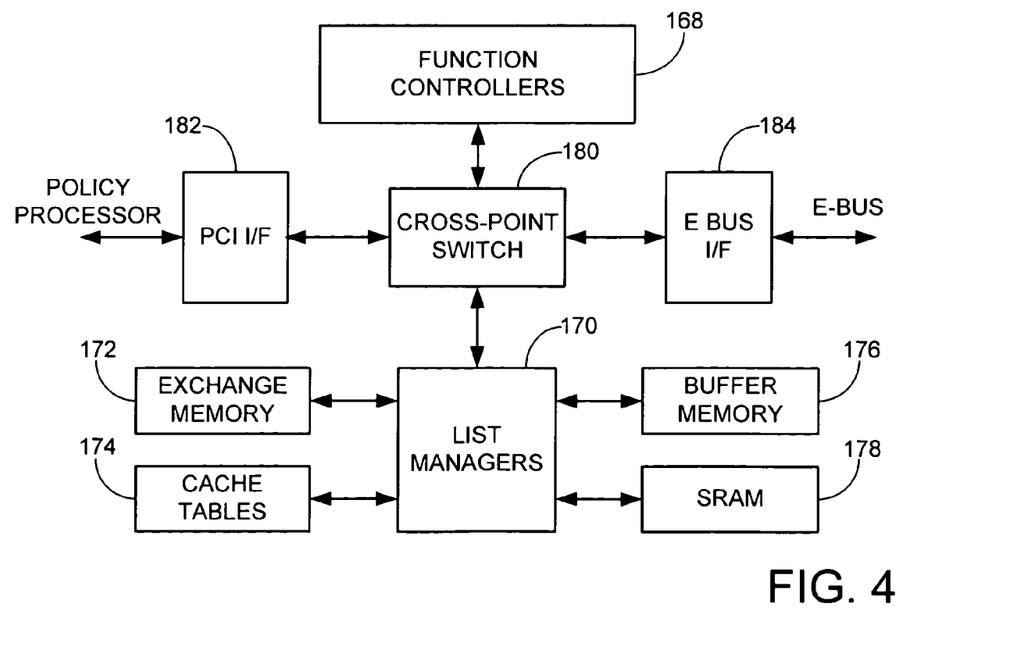
FIG. 4 provides a functional block diagram of a selected intelligent storage processor of FIG. 3.

FIG. 4 provides a preferred construction for a selected ISP of FIG. 3. A number of function controllers, collectively identified at 168, serve as function controller cores (FCCs) for a number of controller operations such as host exchange, direct memory access (DMA), exclusive-or (XOR), command routing, metadata control, and disc exchange. Each FCC preferably contains a highly flexible feature set and interface to facilitate memory exchanges and other scheduling tasks.

A number of list managers, denoted generally at 170 are used for various data and memory management tasks during controller operation, such as cache table management, metadata maintenance, and buffer management. The list managers 170 preferably perform well-defined albeit simple operations on memory to accomplish tasks as directed by the FCCs 168. Each list manager preferably operates as a message processor for memory access by the FCCs, and preferably executes operations defined by received messages in accordance with a defined protocol.

The list managers 170 respectively communicate with and control a number of memory modules including an exchange memory block 172, a cache tables block 174, buffer memory block 176 and SRAM 178. The function controllers 168 and the list managers 170 respectively communicate via a crosspoint switch (CPS) module 180. In this way, a selected function core of controllers 168 can establish a communication pathway through the CPS 180 to a corresponding list manager 170 to communicate a status, access a memory module, or invoke a desired ISP operation.

Similarly, a selected list manager 170 can communicate responses back to the function controllers 168 via the CPS 180. Although not shown, separate data bus connections are preferably established between respective elements of FIG. 4 to accommodate data transfers therebetween. As will be appreciated, other configurations can readily be utilized as desired.

A PCI interface (I/F) module 182 establishes and directs transactions between the policy processor 156 and the ISP 142. An E-BUS I/F module 184 facilitates communications over the E-BUS 146 between FCCs and list managers of the respective ISPs 142, 144. The policy processors 156, 158 can also initiate and receive communications with other parts of the system via the E-BUS 146 as desired.

The controller architecture of FIGS. 3 and 4 advantageously provides scalable, highly functional data management and control for the array. Preferably, stripe buffer lists (SBLs) and other metadata structures are aligned to stripe boundaries on the storage media and reference data buffers in cache that are dedicated to storing the data associated with a disk stripe during a storage transaction.

To further enhance processing efficiency, the controller architecture preferably employs a novel writeback data caching methodology. Generally, data to be written to the storage devices 100 are cached in memory, and scheduling for transfer (flushing) to the storage devices 100 at a later time. As explained below, a "wave flushing" technique is preferably employed to transfer relatively large quantities of the accumulated writeback data to the devices 100 in a fast and efficient manner.

Figure 5:
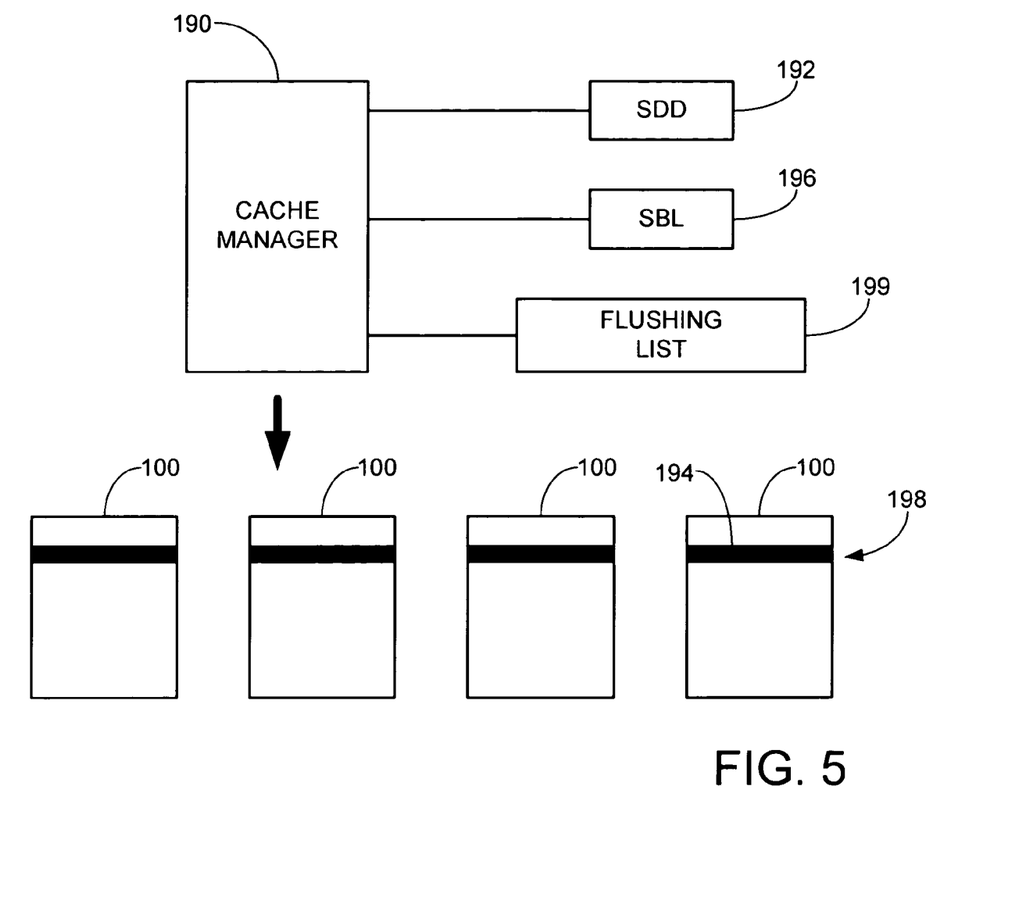
FIG. 5 generally illustrates a cache manager which operates to flush data to the storage array in accordance with preferred embodiments.

As shown in FIG. 5, the cached data are preferably managed on a node basis by a cache manager (CM) 190 using a data structure referred to as a stripe data descriptor (SDD) 192. Each SDD holds data concerning recent and current accesses to the data with which it is associated. Each SDD preferably aligns to a corresponding RAID stripe 194 (i.e., all of the data on a selected device 100 associated with a particular parity set), and conforms to a particular SBL 196.

Each cache node managed by the CM 190 preferably references some particular SDD, with active SDD structures for a given set of logical discs (subset of the devices 100) being preferably linked in ascending order via a virtual block address (VBA) using a standard forward and backward linked list.

Preferably, the VBA values are aligned with the RAID data organization using a grid system sometimes referred to as a RAID Allocation Grid System (RAGS). A discussion of such grid system organization can be found, for example, in U.S. Published Patent Application No. US2005/0223156A1 published Jun. 6, 2005, and now issued as U.S. Pat. No. 7,237,062, assigned to the assignee of the present application. Generally, any particular collection of blocks belonging to the same RAID strip 198 (e.g., all of the data contributing to a particular parity set) will be assigned to a particular reliable storage unit (RSU) on a particular sheet.

A book consists of a number of sheets and is constructed from multiple contiguous sets of blocks from different devices 100. Based on the actual sheet and VBA, the books can be further sub-divided into zones, indicating the particular device or device set (when redundancy is employed).

Each SDD preferably includes variables that indicate various states of the data, including access history, locked status (e.g., write protected), last offset, last block, timestamp data (time of day, TOD), identifiers to which zone (book) the data belong, and RAID level employed. Preferably, writeback ("dirty" data) status of the data associated with the SDD is managed in relation to dirty data, dirty buffer, dirty LRU and flushing LRU values.

Preferably, the CM 190 concurrently operates to manage the writeback data processes at a number of different levels, depending on system requirements. A first level generally involves the periodic flushing of full SDD structures when a full RAID strip 198 is detected. This can be readily carried out for a given SDD 192 based on the RAID level variable when the SDD identifies the associated data as dirty. Preferably, this involves a backward inspection to determine if enough consecutive adjacent SDD structures are sufficiently full of dirty data. If so, these SDD structures are placed on a flushing list (denoted at 199) and a request is made to commence flushing of the data. Flushing list status can be set using the flushing LRU value of the SDD 192.

Flushing smaller sets of data are preferably handled on an SDD basis. Any SDD with dirty blocks and no locked blocks are preferably set as dirty LRU and sorted by age (e.g., time the data has spent in the cache waiting flushing). Once a particular aging is reached, the flushing LRU variable is preferably set and the flushing list 199 is updated.

The foregoing operations are preferably carried out during normal operation in an effort to manage the transfer of the cached writeback data to the storage array. However, under certain circumstances a relatively large amount of writeback data can nevertheless be accumulated in cache memory.

For example, some operational environments can be dominated by writes; that is, the users of the system can provide a significantly higher number of write requests as compared to read requests. Depending on the operational loading, exemplary write to read ratios can be substantial (e.g., 8:1 or more), which means that, on an ongoing basis, for every read request received to retrieve data from the devices 100, the CM 190 is faced with the need to write multiple sets of accumulated writeback data to the devices 100.

Figure 6:
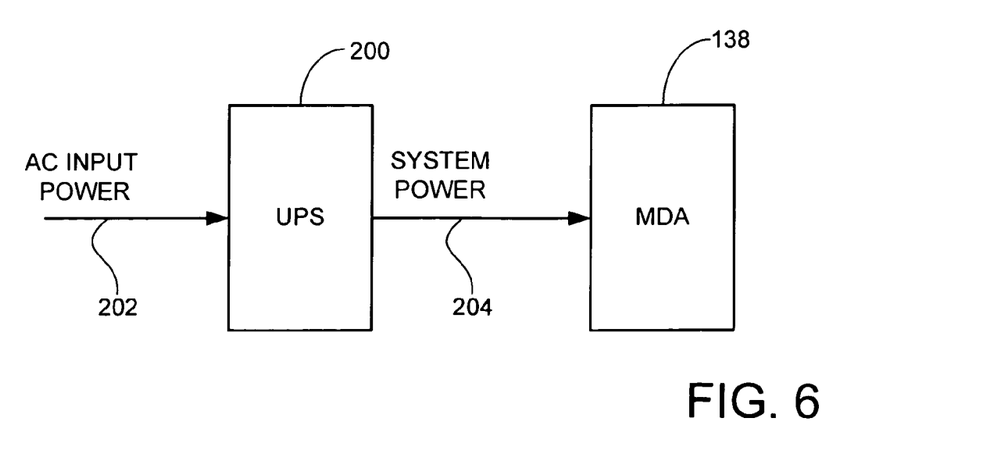
FIG. 6 shows the MDA of FIG. 2 in conjunction with an uninterruptible power supply (UPS) module.

Moreover, periodic conditions can arise that require the writing of all of the then existing cached writeback data to the devices as quickly as possible. FIG. 6 illustrates a preferred use of an uninterruptible power supply (UPS) module 200 coupled between an input ac power line 202 and the MDA 138 of FIG. 2.

During normal operation, the UPS module 200 operates to pass regulated power to the MDA 138 via path 204. In the event of a loss of the input power on path 202 such as due to a storm or other event, the UPS module 200 preferably continues to supply power to the MDA 138 from an internal battery array (not separately shown).

However, it will be appreciated that the UPS module 200 can only supply power to the MDA 138 for a limited amount of time before the battery array is exhausted. It is thus desirable that the MDA 138 complete the writeback of all cached data to the devices 100 within this time to prevent data loss.

Accordingly, the CM 190 is further preferably configured to satisfy relatively large numbers of writeback requests by wave flushing sets of writeback data from cache memory to the media 106. This can be explained with reference to FIG. 7, which shows a selected surface of the media 106 (FIG. 1) of a selected device 100. The media surface is divided into radially concentric logical groups 206. The groups 206 are denoted 1 to n from an outermost diameter (OD) to an innermost diameter (ID) of the medium (disc) 106.

Figure 7:
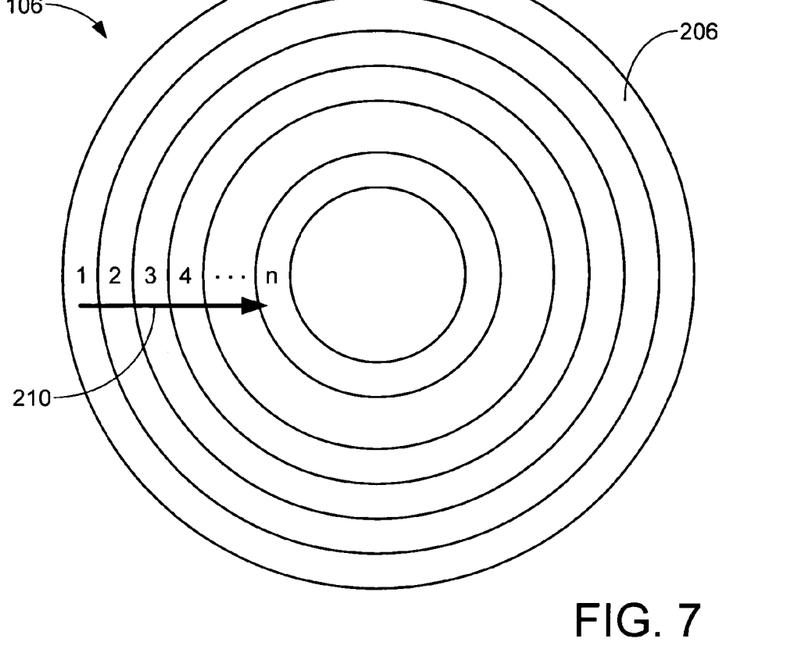
FIG. 7 illustrates a number n of logical groups defined on a surface of a storage medium of the device of FIG. 1 in accordance with preferred embodiments.

Each logical group 206 comprises a selected number of tracks on which sectors (logical blocks) of selected size are formed (e.g., 512 bytes, 4096 bytes, etc.). The logical groups 206 can all have a common maximum data capacity, or can have different respective data capacities. Although not required, each group 206 preferably corresponds to a RAID stripe 194 (FIG. 5) or a portion thereof, and is further linked via a common book to other associated groups 206 on other devices 100. Such virtual locality can thus be used to guarantee physical locality on the media.

Preferably, the wave flushing operation involves the CM 190 directing writeback operations to each of the logical groups 206 while advancing the associated write transducer 110 in a single radial direction across boundaries between the logical groups. The CM 190 preferably utilizes the SDD data to track the cached writeback data by group.

Figure 8:
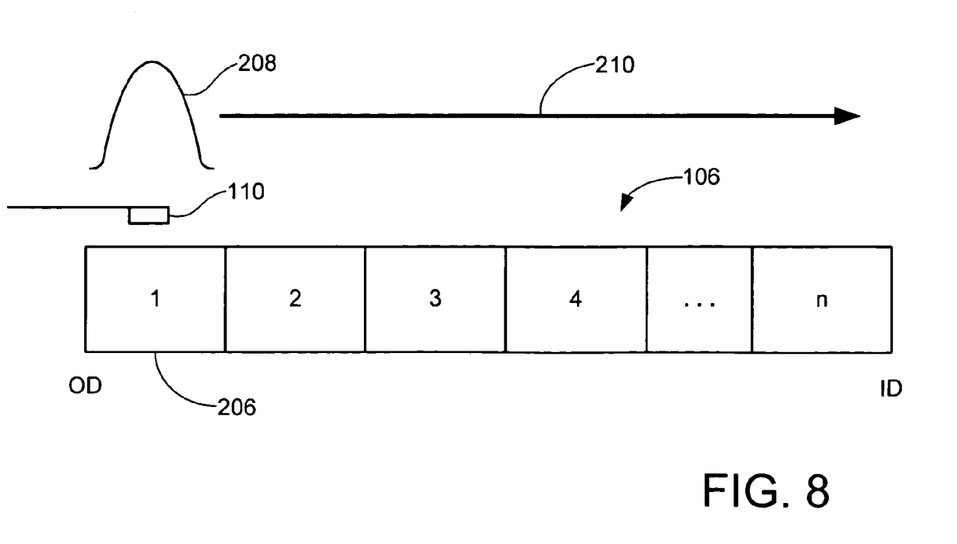
FIG. 8 shows a wave constituting a number of write operations to each group, with the wave preferably advancing across the medium as shown.

FIG. 8 shows a media surface with logical groups 206 from 1 to n. A "wave" 208 in FIG. 8 generally represents writeback data transfer operations within each of the groups in turn, with the wave traveling across the media 106 along path 210. This can be viewed as generally analogous to a wave phenomenon that can sometimes be observed in a sports stadium as spectators in different sections of the stadium stand up and sit back down in their seats in turn.

In similar fashion, the transducer 110 dwells within the seek range defined by each of the groups 206 to satisfy writeback requests therein for a selected time before successively moving to the next adjacent group 206. It will be noted that while the transducer 110 is within a selected group 206, seeks or other movement of the transducer may be bi-directional; i.e., the transducer may move both toward the ID and the OD while within a selected group 206.

For example, there may be some amount of 'back up' when flush operations require the well-known RMW algorithm often employed for RAID-5 and RAID-6 in order to write data during the "write (W) phase" that was read during the "read (R) phase." In such case, the transducer 110 may move back and forth repeatedly as the writeback data are transferred to the associated group. Preferably, however, the transducer 110 moves in a common direction, such as toward the ID, as each new group 206 is serviced in turn.

In some preferred embodiments, a predetermined service time interval (dwell time) is selected for each group 206 irrespective of the associated amounts of writeback data cached in memory. Thus for example, the CM 190 can be configured to service m writeback requests for data in group 1, followed by m writeback requests for data in group 2, and so on. Alternatively, a timer can be set to identify a series of elapsed time intervals, and the CM 190 proceeds to carry out as many writeback data transfer operations as possible to a selected group until a time-out condition is reached, after which the CM 190 moves to the next group and repeats the foregoing operation.

It follows that under these various embodiments, there may be additional sets of writeback data in the cache memory that were not able to be transferred to the associated group in the allotted service time interval. This is not necessarily a problem. That is, in some circumstances it may be more efficient to move on to a subsequent group (e.g., group 2) to satisfy writeback data transfers there and leave the remaining writeback requests from the last group (e.g., group 1) to be satisfied on a subsequent pass.

Uniformly distributing the writes across the media 106 in this way (i.e., leaving unwritten requests in cache while moving on to the next group) may also generally improve readback response, since pending readback requests can be efficiently satisfied from the associated group in which the wave 208 is currently dwelling.

While the system can be operated in such a manner that data accesses are more or less uniformly distributed across all of the groups, it is sometimes common for certain groups (books) to be "hot"; that is, accessed on a significantly higher basis than other groups. For example, the data stored in the devices 100 corresponding to group 1 may represent certain types of application or database data that receives a significantly higher ratio of accesses (reads and/or writes) than the other groups.

In such case, the wave flushing algorithm is preferably adaptive so that a greater amount of dwell time is spent in hot groups as compared to the remaining groups. This is generally illustrated by the exemplary diagram of FIG. 9, which shows a wave 212 over group 1 with a magnitude generally indicative of the service interval applied to that group.

Figure 9:
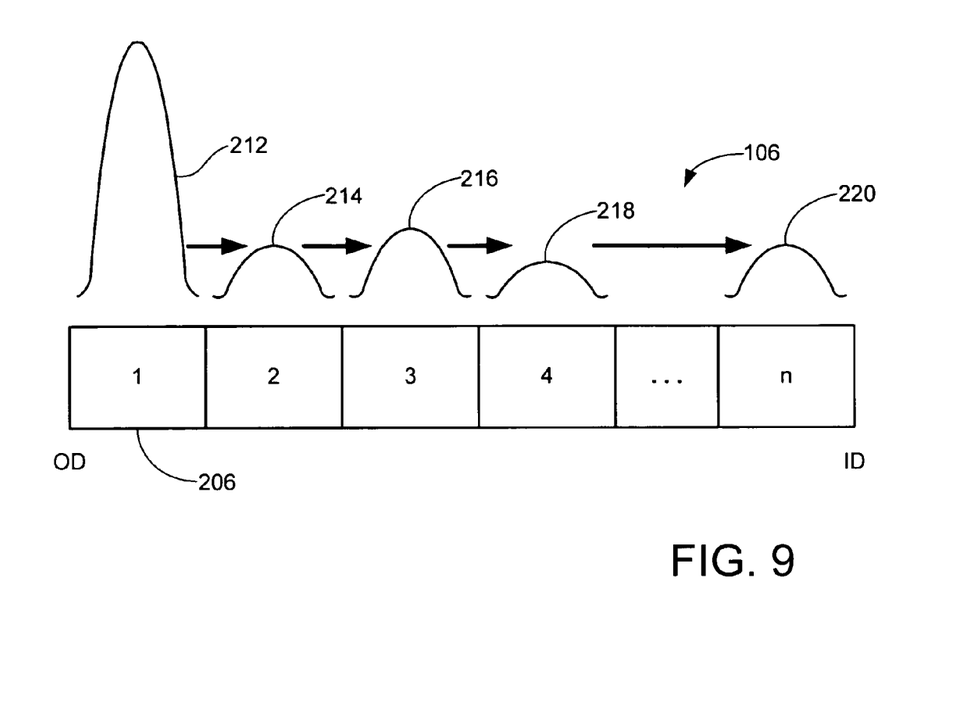
FIG. 9 shows an alternative embodiment wherein the wave is adaptively adjusted in relation to operational loading requirements.

As can be seen, wave 212 has a substantially greater magnitude than waves 214, 216, 218 and 220 associated with the remaining groups 2, 3, 4 and n. Thus, the CM 190 will preferably service writeback requests across all of the groups 206 as before, but will spend more time servicing hot book data (e.g., group 1) as compared to the remaining books in relation to the ratio of accesses between the respective groups.

Figure 10:
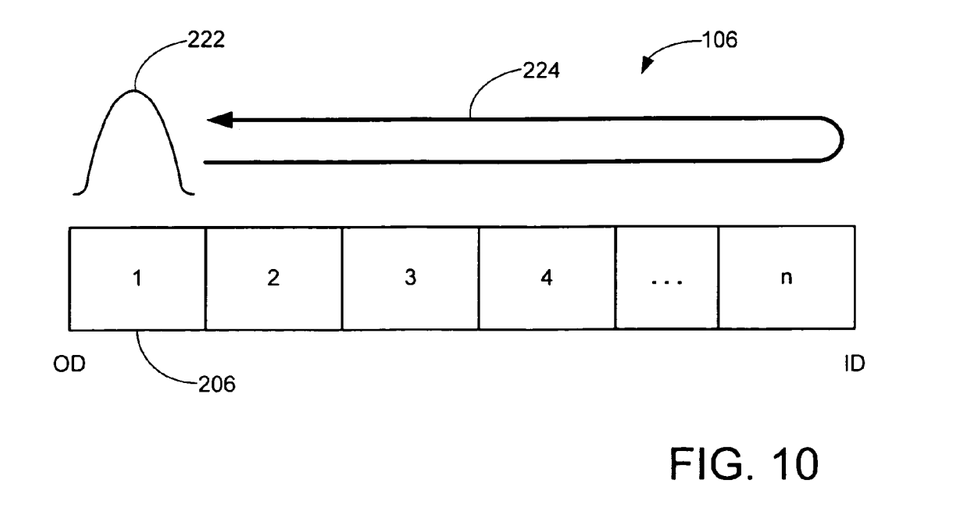
FIG. 10 shows another alternative embodiment wherein the wave is cycled across the groups from an innermost diameter (ID) to an outermost diameter (OD) and then back again to the ID.

FIG. 10 further shows a wave 222 that travels along a path 224 that alternately moves across the groups from the OD to the ID, and then from the ID to the OD. This is an alternative approach to having the sequence start at the OD and move to the ID, followed by an ID-to-OD seek and a restarting of the sequence from OD to ID again, as generally represented in FIGS. 8 and 9. The bi-directional sequence of FIG. 10 advantageously eliminates the significant seek latency of carryout out a full ID-to-OD disc seek.

It is contemplated that the wave flushing operation set forth herein is preferably carried out on a continual basis when large amounts of cached writeback data are detected, and may be subject to interruption from time to time. For example, the wave may be over a first group (e.g., group 2) when a high priority read request is received for data in another, relatively distant group (e.g., group 8). Under such circumstances, it may be necessary for the system to immediately seek to the requested data to service the readback request.

After satisfying the request, the CM 190 has the option of returning the transducer 110 to the original group to continue the wave flushing where it left off. However, it may be more efficient to proceed with wave flushing in the new group and continue on from there, leaving the remaining writeback requests from the earlier group to be satisfied later. The CM 190 is preferably provided with adaptive capabilities to adjust subsequent write levels to substantially maintain a uniform writing of the writeback data across the groups while maintaining seek latencies at a minimum.

When presented with the writing of sets of writeback data in a selected group, sets of cached writeback data for that group may be selected for writing during a given wave flush based on a number of factors, such as aging (e.g., the oldest sets from the flushing list 199 are assigned higher priority, etc.). Threads of closely associated writes can also be formed and flushed in a single operation. Speculative data reads to pull unrequested readback data into cache memory can also take place as desired in each group. Cached readback data retention policies can further take into account the locality of the transducer 110 to a given group during the wave flush operation.

Figure 11:
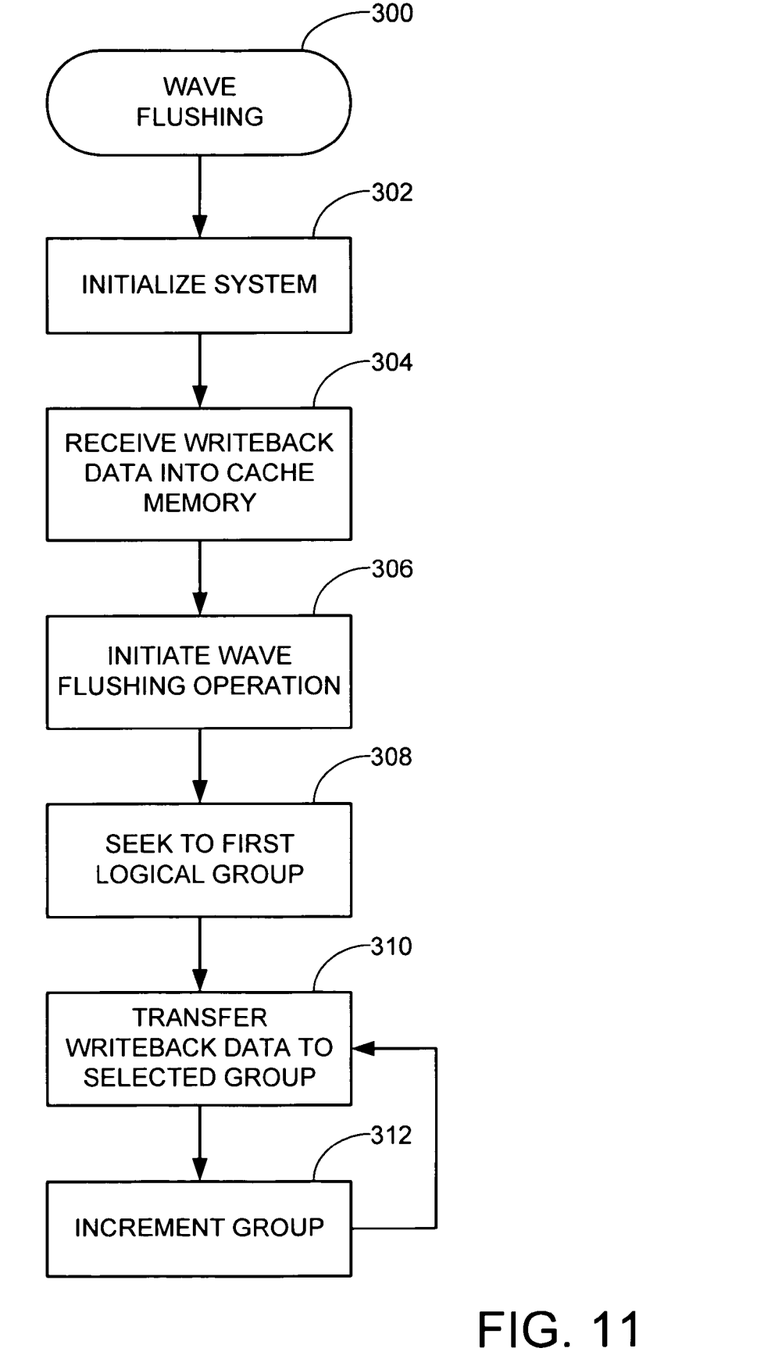
FIG. 11 is a flow chart for a WAVE FLUSHING routine, generally illustrative of steps carried out in accordance with preferred embodiments of the present invention.

FIG. 11 sets forth a flow chart for a WAVE FLUSHING routine 300, generally illustrative of steps carried out in accordance with preferred embodiments. At step 302, a system such as set forth in FIG. 2 is initialized for the transfer of data with an array of storage devices 100. At step 304, sets of writeback data are received from a host device for storage to the devices 100. During this step, the controller 122 preferably moves the writeback data to cache memory, supplies a command complete status to the host device, and schedules the writing of the data to the devices 100 at a subsequent time.

Preferably, at some point during the operation of the system, a wave flushing operation will be invoked, as set forth at step 306. As discussed above, wave flushing can be invoked as a result of a detected service pattern heavily dominated by writes, as evidenced for example by the accumulation of a sufficient amount of writeback data in the cache memory. Alternatively, the wave flushing mode can be invoked as a result of a signal from UPS module 200 indicating that a power failure has occurred, indicating that the then existing writeback data in cache needs to be moved to the storage devices 100 as quickly as possible.

At step 308 the transducers 110 associated with all or a subset of the devices 100 are moved to a first logical group 206, such as group 1 in FIGS. 7-10. At step 310, wave flushing commences as variously described above to transfer writeback data to that group. The next group is selected at step 312, and the process continues for each group in turn, preferably moving across group boundaries in a common direction as herein described.

Depending on the operational loading, the various preferred embodiments discussed herein can provide significant improvements in the rate at which data are written to the media 110, both on an on-going basis during normal system operation, or in the event of an emergency shut-down operation. It is contemplated that utilizing the wave flushing techniques set forth herein can reduce the required backup battery time of the UPS module 200 significantly, such as by 50% or more, as compared to conventional writeback data techniques. This can provide significant capital and operational cost savings to the user.

Those skilled in the art will appreciate that the wave flushing approaches disclosed herein may have particular utility when, for a given logical group, all of the data for all of the devices 100 involved are arranged to be in the same concentric ring area of the respective media 106. In this way, the various transducers 110 of the respective devices 100 can be concurrently moved to the same "ring" area to service writeback flushing to that group, and then moved on to the next group.

Moreover, it will be appreciated that higher levels of high priority read requests received at a particular time may reduce the desirability of the wave flush technique. Thus, the wave flush operation may be configured as a default operation that takes place in the background when certain circumstances are not otherwise present (e.g., initiate and continue wave flushing so long as the total number of reads or other high priority commands remains below a small threshold level, etc.).

For purposes of the appended claims, the term "wave flushing" and the like will be construed consistent with the foregoing discussion as the generation of a wave of write operations to each of a plurality of logical groups radially concentric with respect to a storage medium while advancing a write transducer in a single radial direction across boundaries between immediately adjacent groups. The recited "first means" will be understood to correspond to at least the cache manager 190 which carries out a wave flushing operation as discussed hereinabove.

It is to be understood that even though numerous characteristics and advantages of various embodiments of the present invention have been set forth in the foregoing description, together with details of the structure and function of various embodiments of the invention, this detailed description is illustrative only, and changes may be made in detail, especially in matters of structure and arrangements of parts within the principles of the present invention to the full extent indicated by the broad general meaning of the terms in which the appended claims are expressed. For example, the particular elements may vary depending on the particular application without departing from the spirit and scope of the present invention.

What is claimed is:

1. A method comprising wave flushing sets of writeback data from a cache memory to each of a plurality of 1 to n multi-track logical groups radially concentric with respect to a storage medium by servicing each group with a write transducer for a predetermined dwell time in turn irrespective of an associated amount of writeback data in the cache memory for each group, an amount of writeback data less than a scheduled amount of cached writeback data is transferred during said wave flushing to one or more groups before the predetermined dwell time expires, and the write transducer alternately services the groups in order from 1 to n and then from n to 1.

2. The method of claim 1, wherein the wave flushing step is carried out while advancing the write transducer across boundaries between immediately adjacent groups, and wherein the write transducer transitions to each successive group at the conclusion of the predetermined dwell time for each immediately previous group.

3. The method of claim 1, wherein the wave flushing step comprises dividing the storage medium into said plurality of logical groups, assigning a separate dwell time to each said group, and servicing data transfer commands with each group in turn during the associated separate dwell time assigned thereto.

4. The method of claim 1, wherein less than all of the writeback data in the cache memory associated with a selected group are transferred to the selected group at a conclusion of the predetermined dwell time for the selected group.

5. The method of claim 1, wherein each logical group of the plurality of logical groups can store a maximum amount of data, wherein this maximum amount of data is the same for each said group, and wherein a total amount of writeback data transferred to each group is less than said maximum amount of data.

6. The method of claim 1, wherein the wave flushing step comprises sequentially moving the write transducer to different tracks within a selected logical group to transfer said sets of writeback data thereto, said movement comprising at least one seek in a direction toward an innermost diameter (ID) of the medium and at least one seek in a direction toward an outermost diameter (OD) of the medium.

7. The method of claim 1, wherein the predetermined dwell time comprises a separate elapsed time for each group, and wherein the separate elapsed time for each group is a common amount of elapsed time.

8. The method of claim 1, wherein less than all of the sets of writeback data pending in the cache memory are flushed to the storage medium during the wave flushing step, and wherein at least one read operation is carried out to transfer readback data to the cache memory during the predetermined dwell time for each group.

9. The method of claim 1, wherein each of the logical groups corresponds to an associated RAID stripe.

10. The method of claim 1, further comprising a prior step of activating an uninterruptible power supply (UPS) module to supply backup battery power in response to an input power loss condition, wherein the wave flushing step is carried out in response to the activating step to write the sets of writeback data to the medium prior to a loss of said backup battery power from the UPS module.

11. An apparatus comprising a cache manager configured to wave flush sets of writeback data from a cache memory to each of a plurality of 1 to n multi-track logical groups radially concentric with respect to a storage medium by servicing each group over an associated predetermined dwell time in turn irrespective of an associated amount of writeback data in the cache memory for each group, an amount of writeback data less than a scheduled amount of cached writeback data is transferred to one or more groups before the predetermined dwell time expires, and the cache manager directs a write transducer to alternately service the groups in order from 1 to n and then from n to 1.

12. The apparatus of claim 11, wherein the associated predetermined dwell time for each group is the same.

13. The apparatus of claim 11, wherein the associated predetermined dwell time for at least one group is significantly longer than the associated predetermined dwell time for other groups.

14. The apparatus of claim 11, wherein the cache manager sequentially advances write transducer across adjacent group boundaries to carry out write operations to each said group in turn from group 1 adjacent an outermost diameter (OD) of the medium to group n adjacent an innermost diameter (ID) of the medium, immediately followed by sequentially advancing the write transducer to carry out write operations to each said group in turn from group n to group 1.

15. The apparatus of claim 11, wherein the wave flushing operation is interrupted to service a high priority read request in a non-adjacent group.

16. The apparatus of claim 11, wherein each of the logical groups corresponds to an associated RAID stripe.

17. The apparatus of claim 11, wherein the predetermined dwell time for each said group comprises a preselected maximum number of write operations that can be executed to write the cached writeback data to each group irrespective of a total number of pending write operations associated with the cached writeback data for said group.

18. The method of claim 11, wherein less than all of the writeback data pending in the cache memory are flushed to the storage medium during said wave flushing by the cache manager, and wherein the cache manager directs execution of at least one read operation to transfer readback data to the cache memory during the servicing of each group.

19. A method comprising wave flushing sets of writeback data from a cache memory to each of a plurality of multi-track logical groups radially concentric with respect to a storage medium, each group is serviced by a write transducer for a predetermined dwell time in turn irrespective of an associated amount of writeback data in the cache memory for each group, an amount of writeback data less than a scheduled amount of cached writeback data is transferred to one or more groups before the predetermined dwell time expires, and the wave flushing operation is temporarily interrupted to move the write transducer from an existing group to a non-adjacent group to service a high priority read request.

20. The method of claim 19, wherein at the conclusion of the servicing of the high priority read request, the wave flushing operation is resumed beginning at the non-adjacent group.

21. The method of claim 19, wherein at the conclusion of the servicing of the high priority read request, the write transducer is moved back to the existing group to resume said write flushing operation.

22. The method of claim 19, wherein the plurality of multi-track logical groups are identified as groups 1 to n, and wherein the write transducer alternately services the groups in order from 1 to n and then from n to 1.

* * * * *